US006974911B2

(12) United States Patent
Hyde

(10) Patent No.: US 6,974,911 B2
(45) Date of Patent: Dec. 13, 2005

(54) MODULAR WIRING SYSTEM

(75) Inventor: Douglas Hyde, Ottawa (CA)

(73) Assignee: Electec Limited, Ottawa (CA)

( * ) Notice: Subject to any disclaimer, the term of this patent is extended or adjusted under 35 U.S.C. 154(b) by 0 days.

(21) Appl. No.: 10/434,697

(22) Filed: May 9, 2003

(65) Prior Publication Data

US 2004/0222008 A1 Nov. 11, 2004

(51) Int. Cl.[7] .............................................. H02G 15/02
(52) U.S. Cl. ................ 174/74 R; 439/502; 174/110 R; 174/113 R
(58) Field of Search ........................ 174/110 R, 113 R, 174/113 C, 116, 36, 74 R, 80; 439/502

(56) References Cited

U.S. PATENT DOCUMENTS

| | | | | |
|---|---|---|---|---|
| 4,399,371 A | | 8/1983 | Ziff et al. | 307/147 |
| 4,437,725 A | | 3/1984 | Eaby et al. | 339/156 |
| 4,775,802 A | | 10/1988 | Dods | 307/147 |
| 4,857,016 A | | 8/1989 | Benscoter et al. | 439/680 |
| 5,074,801 A | | 12/1991 | Siemon | 439/188 |
| 5,154,629 A | | 10/1992 | Carver et al. | 439/352 |
| 5,272,277 A | | 12/1993 | Humbles et al. | 174/48 |
| 5,362,923 A | | 11/1994 | Newhouse et al. | 174/48 |
| 5,366,388 A | * | 11/1994 | Freeman et al. | 439/540.1 |
| 5,387,110 A | * | 2/1995 | Kantner et al. | 439/59 |
| 5,435,752 A | | 7/1995 | Siemaon et al. | 439/620 |
| 5,458,503 A | | 10/1995 | Below | 439/404 |
| 5,504,540 A | * | 4/1996 | Shatas | 348/844 |
| 5,518,416 A | * | 5/1996 | Kantner et al. | 439/352 |
| 5,538,428 A | * | 7/1996 | Staubli | 433/173 |
| 5,571,035 A | * | 11/1996 | Ferrill | 439/894 |
| 5,605,473 A | * | 2/1997 | Kishon | 439/502 |
| 5,634,817 A | | 6/1997 | Siemon et al. | 439/608 |
| 5,647,765 A | * | 7/1997 | Haas et al. | 439/609 |
| 5,698,821 A | * | 12/1997 | Herman | 174/72 R |
| 5,791,943 A | | 8/1998 | Lo et al. | 439/676 |
| 5,807,139 A | | 9/1998 | Volansky et al. | 439/638 |
| 5,821,466 A | * | 10/1998 | Clark et al. | 174/113 R |
| 5,834,699 A | * | 11/1998 | Buck et al. | 174/113 R |
| 5,947,765 A | | 9/1999 | Carlson et al. | 439/535 |
| 5,971,799 A | * | 10/1999 | Swade | 439/502 |
| 6,007,361 A | | 12/1999 | Flachslaender | 439/358 |
| 6,114,632 A | * | 9/2000 | Planas et al. | 174/117 R |

(Continued)

FOREIGN PATENT DOCUMENTS

WO WO 95/10871 4/1995

OTHER PUBLICATIONS

IEEE Standard Dictionary of Electrical and Electronics Terms (3rd Edition), Copyright Aug. 10, 1984, p. 114.*

*Primary Examiner*—William H. Mayo, III
(74) *Attorney, Agent, or Firm*—Fulbright & Jaworski LLP

(57) ABSTRACT

A modular terminal connector system for zone wiring systems. A patch panel, a zone box, and a cubicle are connected to each other with cables. Each cable carries a single data channel comprising voice and data communications signals, and has one end coupled to a male compound connector and another end coupled to a female compound connector. The male compound connector includes three plugs and the female compound connector includes three outlets, where the plugs and the outlets are arranged in the same configuration such that the male compound connector can be plugged into the female compound connector. The zone box houses a number of female compound connectors, while the patch panel includes a number of ganged zone boxes. The cubicle or workstation can include a cable grommet for securing a female compound connector therein.

30 Claims, 16 Drawing Sheets

U.S. PATENT DOCUMENTS

| | | | | |
|---|---|---|---|---|
| 6,128,117 | A * | 10/2000 | Kim | 398/115 |
| 6,168,458 | B1 * | 1/2001 | Kraft | 439/488 |
| 6,291,767 | B1 | 9/2001 | Beecher et al. | 174/50 |
| 6,328,601 | B1 | 12/2001 | Yip et al. | 439/608 |
| 6,336,826 | B1 * | 1/2002 | Kraft | 439/498 |
| 6,346,005 | B1 | 2/2002 | Viklund et al. | 439/404 |
| 6,358,091 | B1 * | 3/2002 | Lo et al. | 439/608 |
| 6,371,794 | B1 | 4/2002 | Baure et al. | 439/404 |
| 6,379,174 | B1 | 4/2002 | Siemon et al. | 439/404 |
| 6,494,744 | B1 * | 12/2002 | Lee | 439/610 |
| 6,580,034 | B2 * | 6/2003 | Daane et al. | 174/117 F |
| 6,674,010 | B2 * | 1/2004 | Inui | 174/113 R |
| 2003/0022553 | A1 * | 1/2003 | Chen et al. | 439/540.1 |
| 2003/0228791 | A1 * | 12/2003 | Milan | 439/502 |

* cited by examiner

Figure 1 (Prior Art)

MODULAR WIRING SYSTEM

FIELD OF THE INVENTION

The present invention relates generally to wiring systems for buildings. More particularly, the present invention relates to wiring systems for interconnecting data signals between a patch panel and multiple user workstations.

BACKGROUND OF THE INVENTION

Point-to-point wiring, also known as flood wiring, is a well known method for connecting data signal lines from a patch panel directly to each end user located in a cubicle or at a workstation. Installation of the wiring requires skilled personnel to prepare the wires for hardwiring, which involves tedious tasks such as insulation removal, wire end dressing, identification of individual wires, and terminator attachment, for example. Once wired, the configuration is effectively fixed for a given office environment layout because the wiring is set to specific lengths for connecting each cubicle or workstation to the patch panel. Therefore, any change in the layout requires time consuming re-distribution and preparation of the wiring.

Zone wiring provides a high degree of flexibility for the installation of data signal lines in office environments over point-to-point wiring arrangements. Zone wiring is used for connecting cubicles or workstations of a floor to the patch panel via zone boxes. In particular, zone wiring is well suited to modern open office environments where cubicle or workstation layouts can dynamically change to suit the needs of the users.

FIG. 1 illustrates the generally existing zone wiring setup for connecting data signal lines to individual workstations or cubicles. The zone wiring system 50 includes a patch panel 52, zone boxes 54, workstation area 56, patch cable group 58 and zone cable group 60. Each workstation area 56 can include a networked computer 62, printer 64 and telephone 66. The patch panel 52 is the source of data for a predefined area, such as a floor, and distributes a number of data channels to each zone box 54 via respective patch cable group 58. Each zone box 54 distributes its received data channels to a respective workstation area 56 within a specific area via respective zone cable groups 60. Each patch cable group 58 and each zone cable group 60 includes a plurality of individual physical cables each adapted for carrying a data signal. Each such cable generally includes four twisted pair wires, shielding and an insulating sheath. The carried data signals can be computer network signals. Accordingly, a data channel includes a set of patch cables within patch cable group 58 or zone cables within zone cable group 60 for carrying all data signals for one user. It is readily understood by those skilled in the art that the patch cable group 58 and zone cable group 60 shown in FIG. 1 each include a set of individual, shielded cables respectively including 4 twisted pairs. Thus, zone box 54 receives a plurality of individual patch cables and workstation area 56 receives a plurality of individual zone cables. Each such cable must be installed separately on site, generally by pulling the cable through the installation space in a suspended ceiling or under a raised floor. This requires a large amount of installation time. Running many individual also cables requires a large amount of installation space and makes it tremendously difficult to trace a single cable in the installation space for fault/problem detection. Furthermore, once the ends of the cables are to be connected to a patch panel, zone box or wall outlet, the respective ends of each cable must be identified to ensure correct wiring. Wire stripping and end connection is done on site for each end of each cable, which is associated with significant installer time. Because each zone box receives a number of data channels from the patch panel, the corresponding patch cables are physically grouped together in a patch cable group 58 after placement in the installation space or routed to their respective zone boxes 54. In a similar manner, the individual zone cables corresponding to the same data channel can be physically grouped together and routed to their respective destination workstation areas 56. The segmented nature of the wiring between the patch panel 52 and each workstation area 56 of the zone wiring configuration allows for re-arrangement of workstation layout in a particular zone without modification to the patch wiring 58. In other words, only the zone wiring 60 of the affected zone needs to be modified.

Although zone wiring is easily adaptable to changes in the office layout with a minimal amount of effort, the wires still need to be prepared during their initial installation into the premises. Changes to an office layout after the initial installation may necessitate new wires to replace wires that are too short for the new layout. In both cases, skilled personnel are required on site to prepare the wires and correctly connect them to the appropriate cubicles. More specifically, the skilled person must identify wires belonging to a particular channel and identify specific types of data signal lines within the channel in order to install the appropriate wire terminals. The resulting group of patch wires for one zone box becomes a mass of wire terminals, such that the individual wire terminals belonging to different channels mesh together. Those of skill in the art will appreciate that connecting the wires of each channel to the corresponding connections in the patch panel or zone box is non-trivial, especially if all the terminals are similar in shape, resulting in potential erroneous connections. Hence the labour cost involved for connecting prior zone wiring systems is significant. Erroneous connections can also arise, requiring additional costs to correct.

It is, therefore, desirable to provide a low cost wiring system that is simple to install while minimizing the possibility of erroneous connections.

SUMMARY OF THE INVENTION

It is an object of the present invention to obviate or mitigate at least one disadvantage of previous office wiring systems. In particular, it is an object of the present invention to provide a modular terminal wiring system.

In a first aspect, the present invention provides a building zone wiring system for providing a data connection between a patch panel having a data channel and a workstation. The wiring system includes a first cable for connecting the data channel with a node, the cable having a first male compound connector for plugging into the patch panel and a first female compound connector for location at the node. The wiring system further includes a second cable for continuing the data channel from the node to the workstation, the cable having a second male compound connector configured identical to the first male compound connector and for plugging into the first female compound connector, and a second female compound connector identically configured to the first female compound connector for location at the workstation.

In embodiments of the present aspect, the second female compound connector is housed in a cable grommet for securing the second female compound connector in a structure, and the data channel includes three communication signals. In a further aspect of the present embodiment, the first male compound connector and the second male compound connector include three plugs, where each plug receives a respective communication signal, and the first female compound connector and the second female compound connector include three outlets, where each outlet is coupled to a corresponding plug. The plugs of the first male compound connector and the second male compound connector, and the outlets of the first female compound connector and the second female compound connector are arranged in a predefined configuration, and each plug is removably connectable to each outlet.

In another embodiment of the present aspect, the zone box is shaped to house a predetermined number of second female compound connectors and the patch panel includes a plurality of zone boxes.

In a second aspect, the present invention provides a building wiring system. The building wiring system includes a patch panel, a cable bundle, a zone box, and a cable. The patch panel has a predetermined number of identical female compound receptacles for providing respective data channels therefrom. The cable bundle has identically configured male compound connectors, where each is pluggable into one of the female compound receptacles, for coupling the data channels to corresponding identically configured female compound connectors. The zone box houses the female compound connectors. The cable has a modular male compound connector identically configured to each male compound connector and pluggable into one of the female compound connectors, for coupling one of the data channels to a corresponding modular female compound connector identically configured to each female compound connector.

In an embodiment of the present aspect, the modular female compound connector is housed in a cable grommet for securing the modular female compound connector in a structure.

In a third aspect, the present invention provides a wiring cable. The wiring cable includes a male compound connector and a female compound connector. The male compound connector is removably pluggable into a complementary shaped outlet. The female compound connector is complementary to the male compound connector for receiving a plurality of wires housed in the wiring cable for electrically coupling the male compound connector to the female compound connector.

In an embodiment of the present aspect, the male compound connector includes three plugs, the female compound connector includes three outlets, and each plug is electrically coupled to a corresponding outlet, and the three plugs and the three outlets are arranged in a row configuration.

In a fourth aspect, the present invention provides patch cable having a sheath for transmission of a plurality of data channels. The patch cable includes a predetermined number of zone cables and a predetermined number of communication cables. The predetermined number of zone cables are bundled within the sheath, and each zone cable houses a plurality of communication lines. The predetermined number of communication cables are bundled within each zone cable, and each communication cable houses the communication lines associated with one of the plurality of data channels.

In embodiments of the present aspect, four zone cables are bundled within the sheath and three communication cables are bundled within each zone cable. In another embodiment of the present invention, one end of each communication cable is connected to an outlet and the other end of each communication cable is connected to a plug, where the outlet and the plug are complementary in shape.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a modular terminal connector system for communication and data wiring systems. A patch panel, a zone box, and a cubicle or workstation area are connected to each other with cables. Each cable carries at least one data channel comprising voice and data communications signals, and has one end coupled to a male compound connector and another end coupled to a female compound connector. The male compound connector includes three plugs and the female compound connector includes three outlets, where the plugs and the outlets are arranged in a complementary configuration such that the male compound connector can be plugged into the female compound connector. The zone box houses a number of female compound connectors, while the patch panel includes a number of ganged zone boxes. The cubicle or workstation area can include a cable grommet for securing a female compound connector therein.

Modularity of the system is achieved by setting the male and female compound connectors as the smallest units of the system. The zone box is a larger unitary component adapted to house a predetermined number of female compound connectors, and the patch panel is usually the largest component of the system that houses a number of ganged zone boxes. The configuration of the outlets of each female compound connector are identical, where each outlet provides one data signal line of a data channel. Assembly of the zone boxes and the patch panel is simplified because the same female compound connectors are used exclusively throughout the system. Proper connection of the data signals of a data channel between a source and a destination is simplified because the male compound connectors of each cable include individual plugs having a configuration complementary to the configuration of the outlets of the female compound connector. Naturally, the plugs are complementary in shape to corresponding outlets for convenient insertion and removal.

Figure 2:
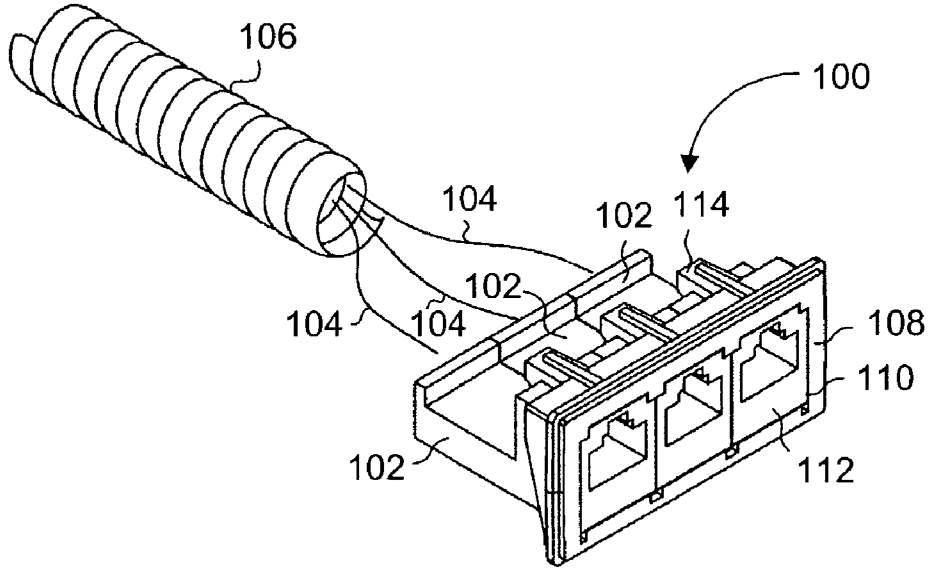
FIG. 2 is a diagram of a female compound connector according to an embodiment of the present invention.

FIG. 2 is a diagram of a female compound connector according to an embodiment of the present invention. Female compound connector 100 includes three commercially available outlets or jacks 102 arranged in a row configuration, where each outlet 102 is connected to respective wires 104. Only one wire 104 is shown connected to a respective outlet 102 to simplify the illustration, but those of skill in the art will understand that the single wire 104 represents the set of wires required for proper functionality of that outlet. The female compound connector 100 embodiment of FIG. 2 is also referred to as a female socket triplet. The configuration of the outlets 102 can be maintained by securing adjacent outlets 102 to each other with glue. Since multiple wires 104 are associated with a single data channel, and three channels are respectively associated with each compound connector, added handling convenience, material savings and reliability can be attained by physically grouping all the wires 104 of the same compound connector into a single cable sheath. Those of skill in the art will understand that any type of signal communication outlet or jack can be used, such as optical communication outlets for example.

In an alternative embodiment, a plastic face plate 108 can be used to secure the three outlets 102 in the row configuration. The face plate 108 can be constructed to retain the three outlets 102 in the row configuration without the need for any glue, or other permanent method of securing the outlets 102 to each other. Face plate 108 has an opening 110 shaped to receive the faces 112 of the three outlets 102, and flexible retaining clips 114 arranged at positions to retain one outlet 102. To assemble female compound connector 100, the outlets 102 are individually inserted into face plate 108. Each flexible retaining clip 114 is deflected away by an upper surface of the outlet 102 until the outlet has been fully inserted. Then the flexible retaining clip 114 engages the edge of the outlet upper surface to retain the outlet 102 in place. This arrangement allows for simple replacement of any defective outlet 102 by physically deflecting the flexible retaining clip 114 while pulling the defective outlet 102 away from face plate 108. Those of skill in the art should understand that plastic face plate 108 can be manufactured from well known techniques such as injection molding for example.

While the female compound connector 100 is assembled at one end of each cable 106, a complementary male compound connector is assembled at the other end of each cable 106. The male compound connector can be plugged into all female compound connectors of the modular wiring system for simple and flexible on-site connection of data signals between the patch panel and the zone boxes, and between the zone boxes and the workstations.

Figure 3:
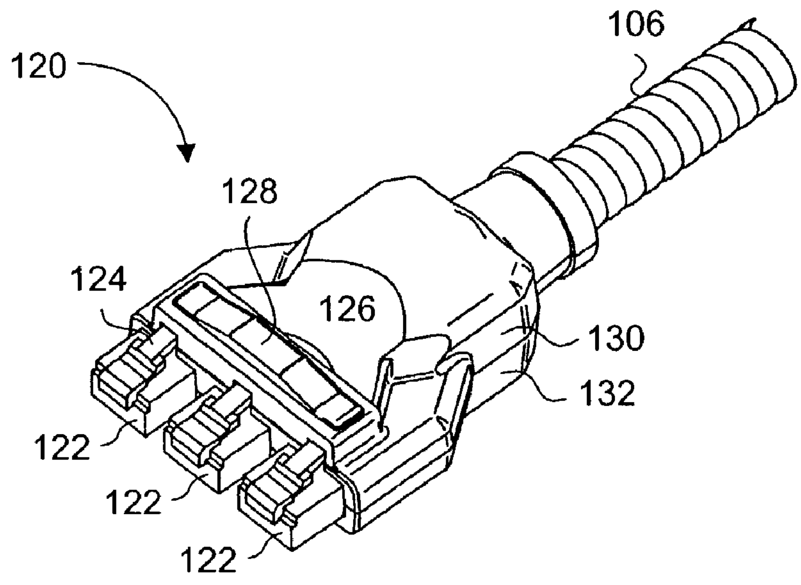
FIG. 3 is a diagram of a male compound connector according to an embodiment of the present invention.

FIG. 3 is a diagram of a male compound connector, also called a male socket triplet, according to an embodiment of the present invention. Male compound connector 120 includes three commercially available plugs 122 arranged in a row configuration. Each plug 122 has a locking tab 124 that interlocks with a complementary outlet, such as outlet 102 of FIG. 2, to prevent inadvertent disconnection. The plugs 122 are partially housed in a socket casing 126 such that their electrical terminals are exposed while a portion of their locking tabs remain inside the socket casing 126. A release button 128 in sliding engagement with the socket casing 126 is positioned over the portion of the locking tabs 124 inside socket casing 126. The plugs 122 are arranged in a row configuration complementary to the row configuration of the outlets 102 of female compound connector 100, such that the male compound connector 120 can be plugged into female compound connector 100. Disconnection of the male compound connector 120 from a female compound connector 100 is achieved by depressing release button 128 for simultaneous depression of all locking tabs 124, and pulling the male compound connector 120 away from female compound connector 100. Those of skill in the art will understand that any type of signal communication plug configured to mate with its corresponding outlet can be used.

Accordingly, the socket casing 126 of male compound connector 120 can be manufactured using well known techniques such as injection molding. In the present example of FIG. 3, socket casing 126 comprises a molded top portion 130 and a molded bottom portion 132 that can be secured together with screws, glue or any other suitable securing means known to those of skill in the art. Socket casing 126 not only provides structural and mechanical support for plugs 122, it also allows for convenient handling by a person installing the modular wiring system. A description of the assembly of male compound connector 120 follows with reference to FIG. 4.

Figure 4:
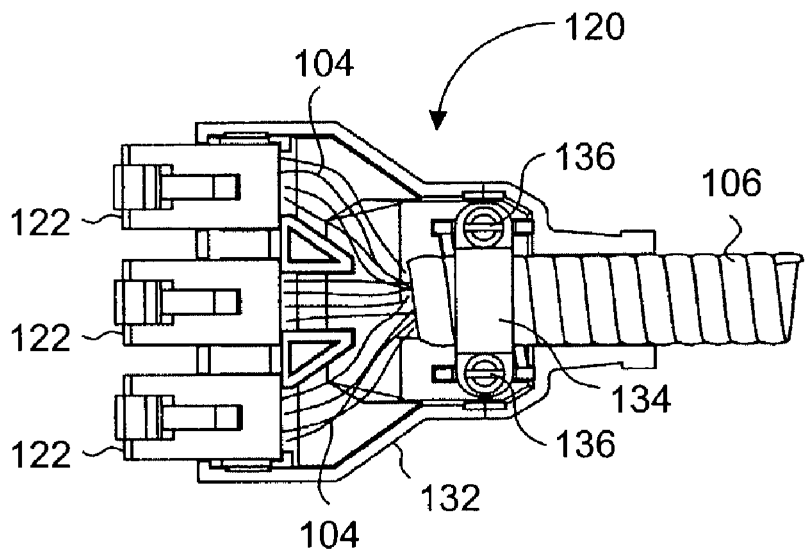
FIG. 4 is a top plan view of the male compound connector of FIG. 3.
Figure 5:
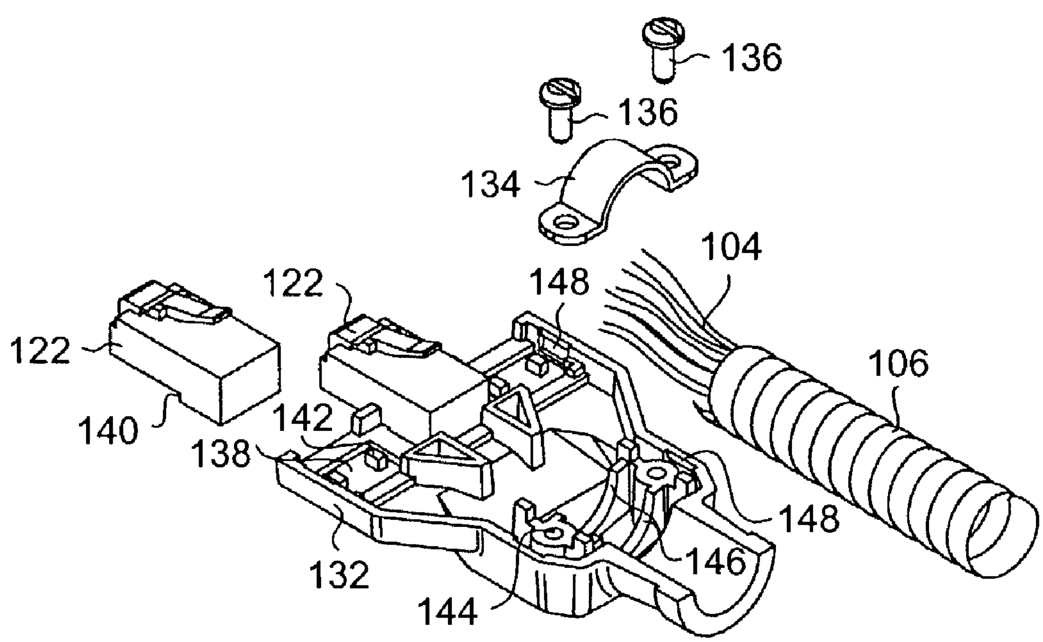
FIG. 5 shows an exploded view of the male compound connector of FIG. 4.

FIG. 4 is a top plan view of male compound connector 120 of FIG. 3 with top portion 130 removed to illustrate the arrangement of its components. In the present example, each plug 122 is coupled to corresponding outlets 112 of the female compound connector 100 shown in FIG. 2 through wires 104 in cable 106. As in FIG. 2, wires 104 represent the actual number of wires required for functionality of each plug 122. Each plug 122 is seated in a dedicated position in bottom portion 132, where each position is shaped for receiving a plug 122. This feature is shown in FIG. 5. While each plug 122 is retained within male compound connector 120 when the top portion 130 and the bottom portion 132 are assembled together, plugs 122 can be optionally glued to the bottom portion 132. Cable 106 is secured to bottom portion 132 by clamp 134 via screws 136 to prevent separation of wires 104 from plugs 122 whenever cable 106 is being pulled away from male compound connector 120. Further details of the plug positions and the cable securing mechanism are shown in FIG. 5.

Figure 6:
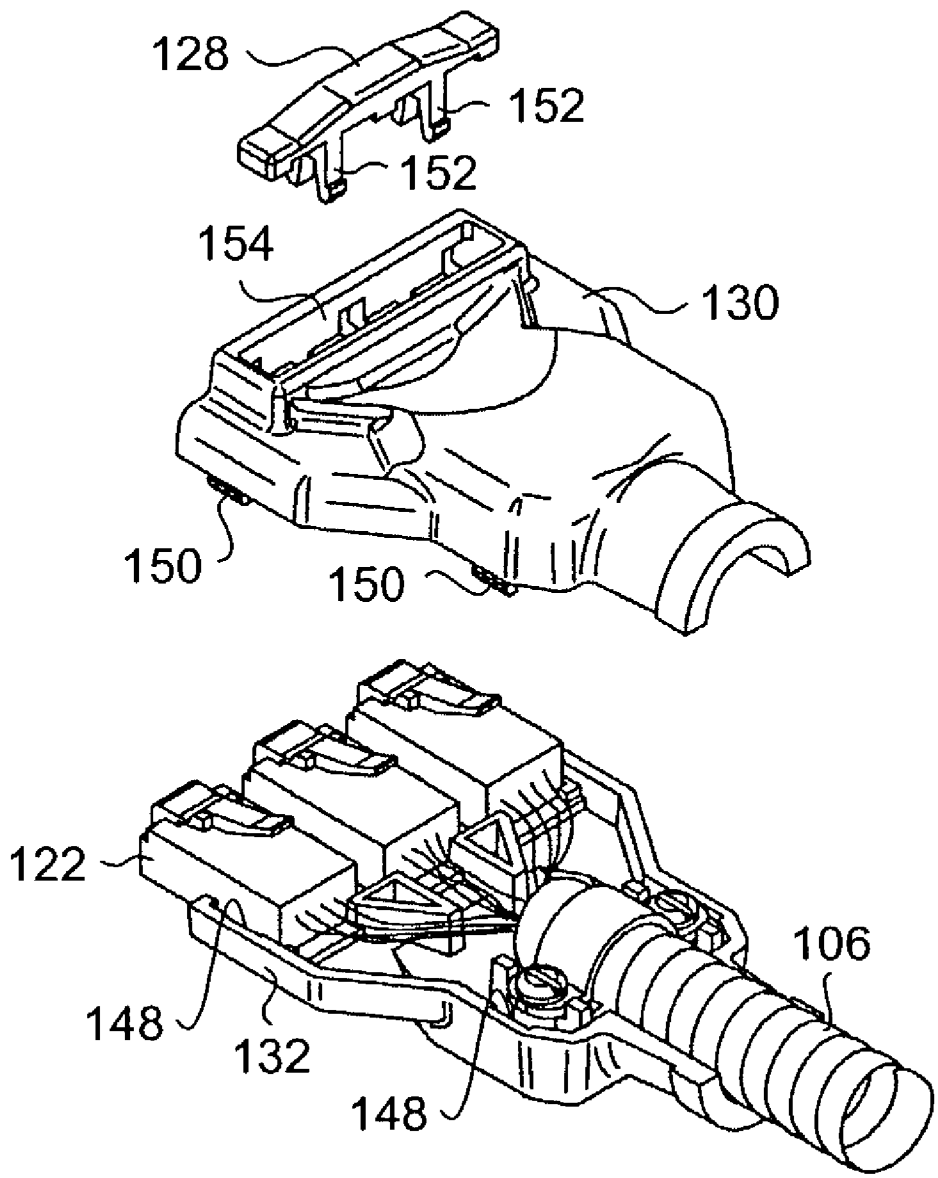
FIG. 6 is an exploded view of an assembled bottom portion of the connector of FIG. 5 and a top portion.

FIGS. 5 and 6 illustrate how the male compound connector 120 shown in FIGS. 3 and 4 is assembled.

FIG. 5 shows an exploded view of the male compound connector components of FIG. 4. One of the plugs 122 is not shown to simplify the illustration. As shown in FIG. 5, bottom portion 132 includes recesses 138 shaped to receive a lower extension of plug 122, where the lower extension is defined by edge 140 to the rear end of plug 122. The depth of recesses 138 is about the same as the length of edge 140. Projections 142 extending perpendicularly from the surface of recesses 138 mate with complementary recesses in the lower extension of plug 122 (not shown). Recesses 138, projections 142 and the lower extension of plug 122 cooperate together to lock plug 122 from any lateral movement relative to the plane of the bottom portion 132. Vertical movement of the plug is prevented after the top portion 130 is secured to the bottom portion 132. To secure cable 106, bottom portion 132 includes a pair of screw apertures 144 for receiving screws 136, and a pair of rounded ribs 146 for receiving cable 106. Hence as clamp 134 presses cable 106 against ribs 146, the frictional contact between the cable 106 and the ribs 146 increases, and cable 106 is secured from accidental separation from male compound connector 120. Bottom portion 132 further includes female snap receptacles 148 for receiving male snaps (not shown) formed on the top portion 130. The top portion 130 with the male snaps is shown in FIG. 6. It is noted that the pair of female snap receptacles arranged on the opposite side of female snap receptacles 148 are not visible in FIG. 5. A description of the male snaps and the female snap receptacles is not required since these are well known means for retaining plastic components together.

FIG. 6 is an exploded view of an assembled bottom portion 132 of FIG. 5 and a top portion 130. The plugs 122, wires 104 and cable 106 are shown in their installed state within bottom portion 132 of the male compound connector 120. Top portion 130 includes male snaps 150 extending from its edges at appropriate positions for engaging the female snap receptacles 148 of the bottom portion 132. Release button 128 is rectangular shaped for sliding engagement with correspondingly shaped rectangular slot 154. Four hooked retaining legs 152 extend from the bottom of release button 128 to engage edges (not shown) within slot 154 to prevent release button 128 from sliding out of rectangular slot 154.

While the outlets of female compound connector 100 and plugs of male compound connector 120 are shown arranged in a row configuration, alternate configurations in which the outlets or plugs are stacked can be used. Of course, those of skill in the art will understand that the female compound connector is not limited to three outlets, and can include more than three outlets for accommodating more communications signals. Furthermore, outlets and plugs having different shapes can be combined together in the male and female compound connectors.

Cable 106 having a female compound connector 100 and male compound connector 120 attached to both its ends illustrates an example of a single cable, called a zone cable according to an embodiment of the present invention. Such a zone cable can be used to connect the electronic devices of a cubicle to a zone box. The present zone cable has the same function as a group of 3 zone wires 60 shown in FIG. 1. In use, the female compound connector 120 of each zone cable is secured in a wall panel, cubicle panel or desk for user accessibility.

Figure 7:
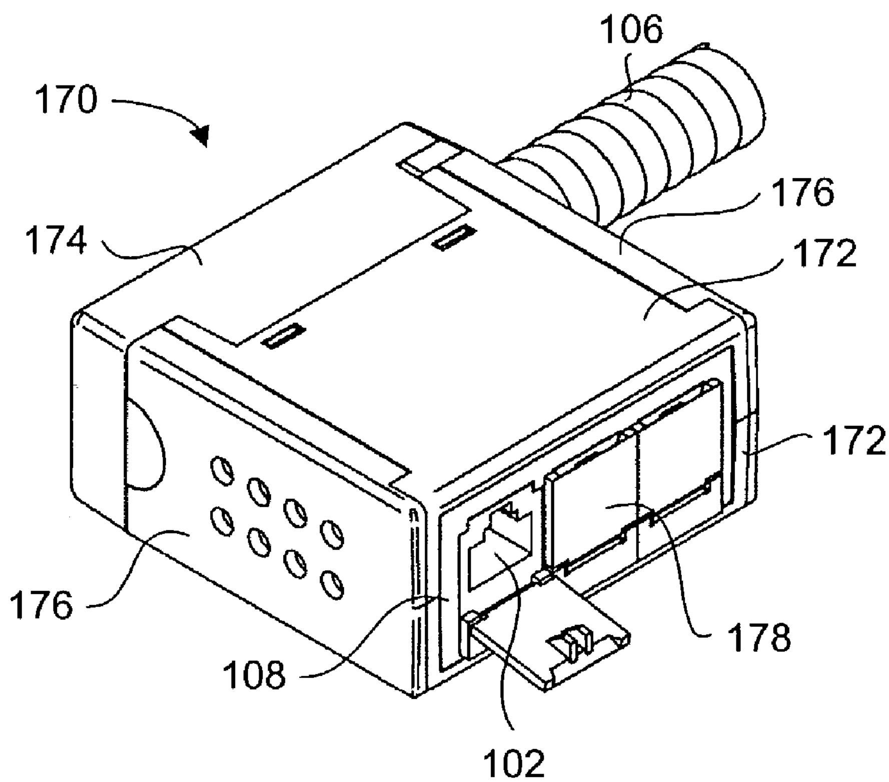
FIG. 7 is an illustration of a wall adaptor for securing the female compound connector of a zone cable in a wall panel.

FIG. 7 is an illustration of a wall adaptor for securing the female compound connector of a zone cable in a wall panel, cubicle panel or desk according to an embodiment of the present invention. More specifically, the wall adaptor houses a female compound connector. Wall adaptor 170 consists of a pair of identical adaptor covers 172, adaptor back cover 174, and a pair of identical side panels 176. Wall adaptor 170 protects the wiring and outlets of the female compound connector and provides convenient means for handling the female compound connector during installation. Although not shown in FIG. 2, the face plate of FIG. 7 includes outlet covers 178 to prevent the accumulation of dust and materials that can damage or inhibit the functionality of outlets 102.

Figure 8:
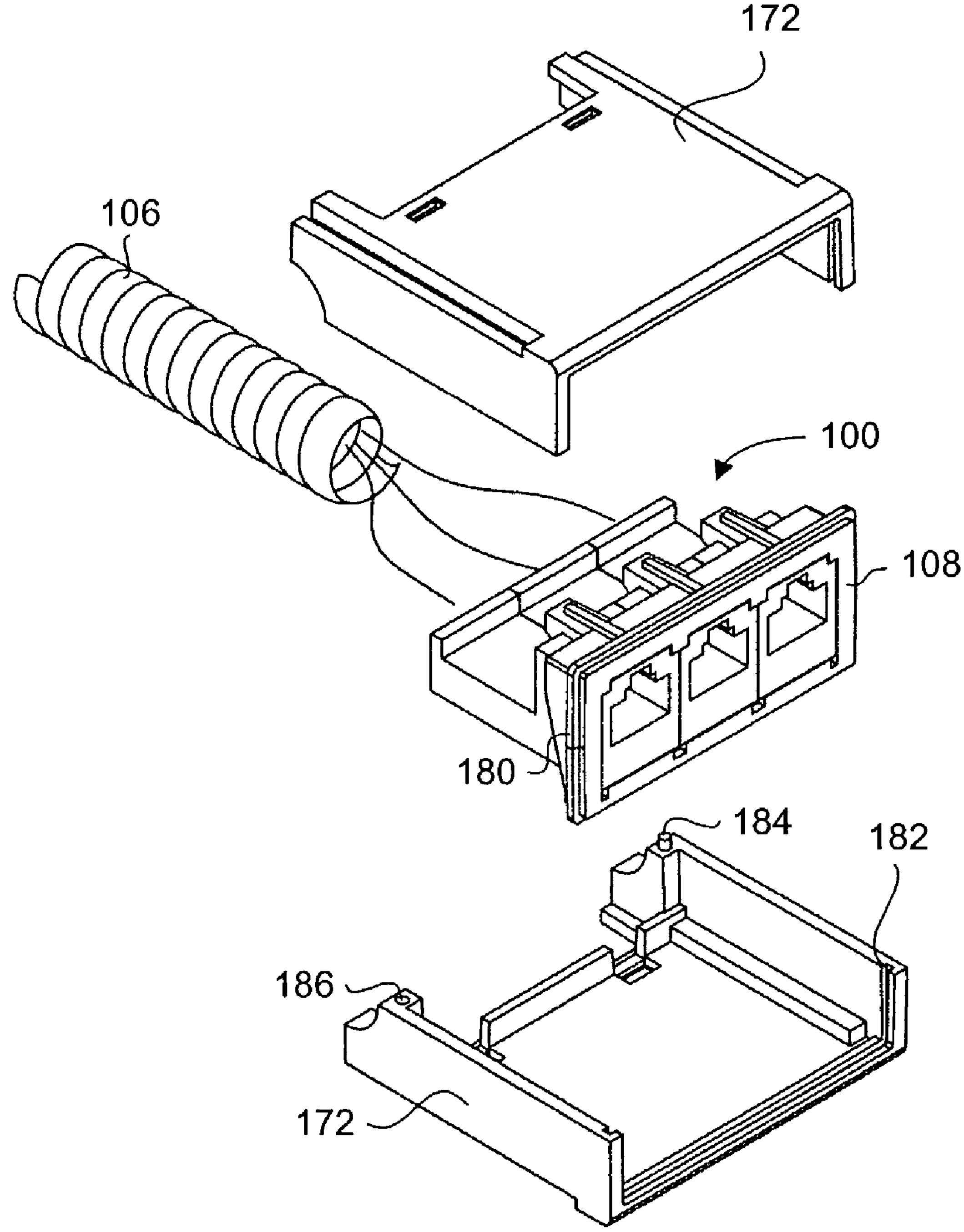
FIGS. 8 to 10 illustrate the assembly sequence of the wall adaptor shown in FIG. 7.
Figure 9:
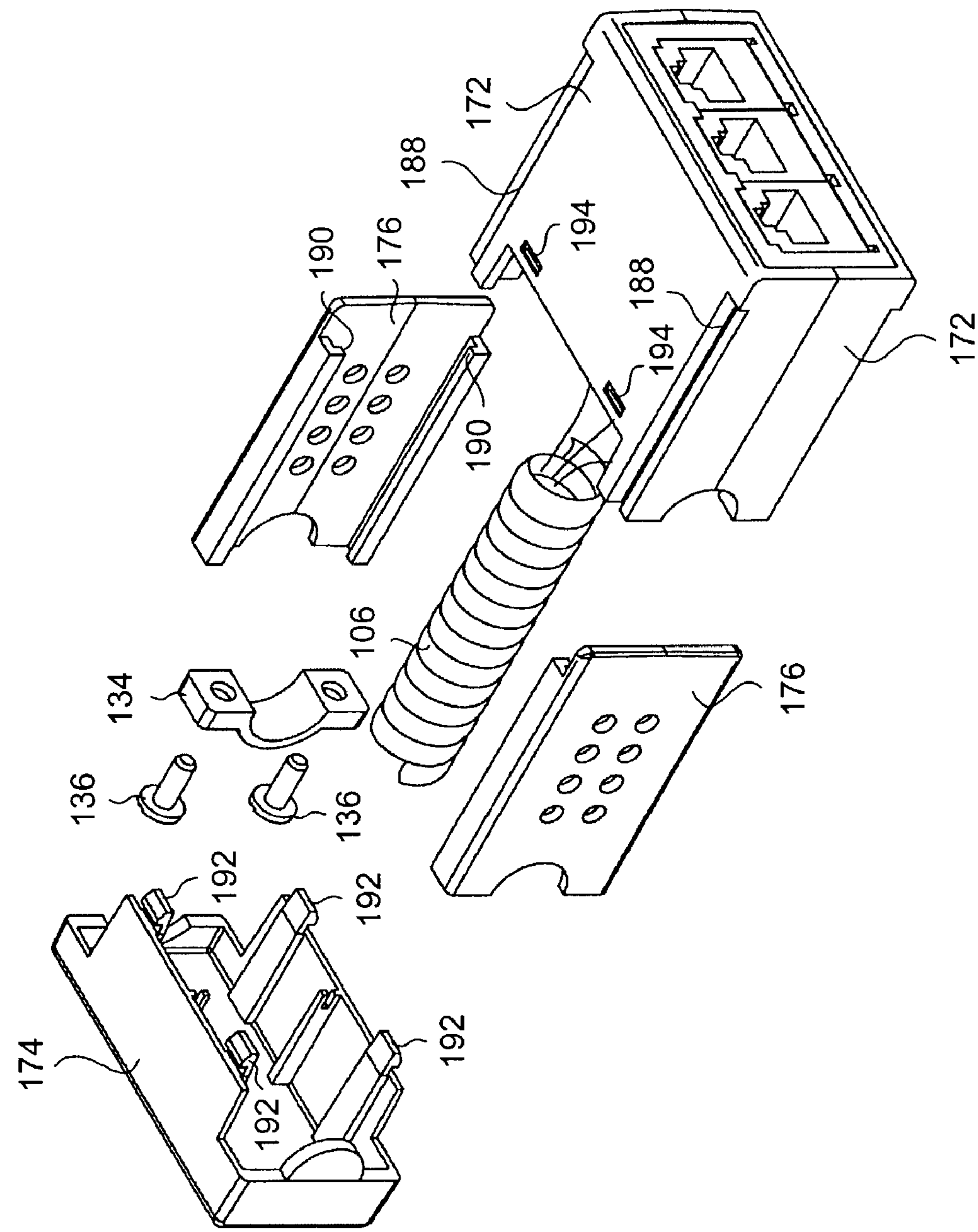
Figure 10:
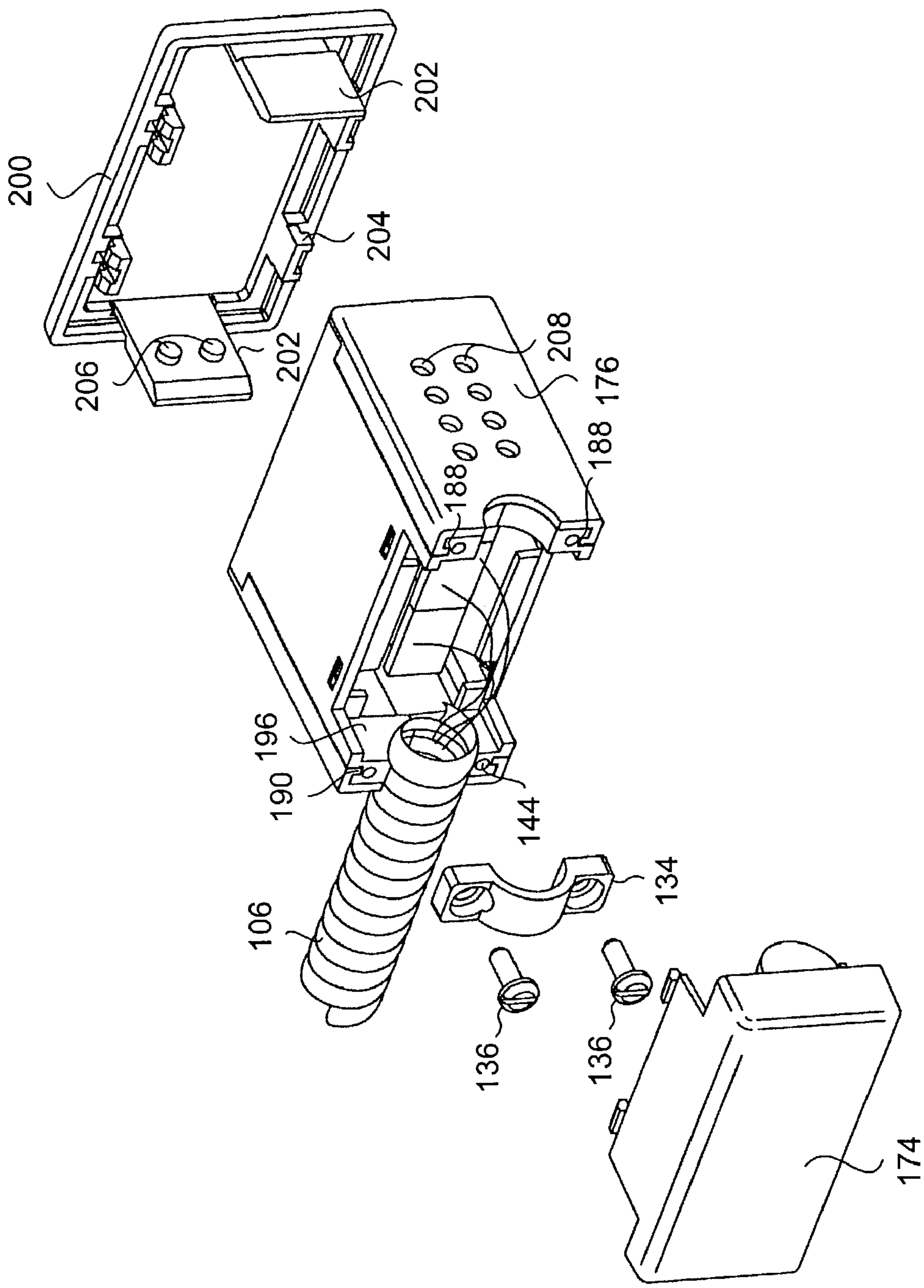

FIGS. 8 to 10 illustrate the assembly sequence of the wall adaptor shown in FIG. 7. In FIG. 8, a female compound connector 100 identical to the one shown in FIG. 2, has a continuous ridge 180 protruding from face plate 108. The continuous ridge 180 mates with corresponding continuous grooves 182 in the adaptor covers 172 by sliding the vertical portions of the continuous ridge 180 into the vertical portions of the continuous grooves 182. When fully inserted, the horizontal portions of the continuous ridge 180 engages the horizontal portions of continuous grooves 182. Each adaptor cover 172 further includes a round projection 184 and a round recess 186 that mate with a corresponding recess and projection respectively on the other adaptor cover 172. Once the pair of adaptor covers 172 enclose face plate 108, the continuous ridge 180, the continuous groove 182, the projections 184 and the recesses 186 cooperate to prevent lateral movement of the adaptor covers 172 relative to each other. It is noted at this stage, the pair of adaptor covers 172 are not yet secured to each other.

In FIG. 9, grooves 188 formed at the corners of each adaptor cover 172 receive corresponding rails 190 of each side panel 176. Grooves 188 are shown in further detail in FIG. 10. Because the grooves 188 do not fully extend from the rear to the front of each adaptor cover 172, each side panel 176 is slid onto the grooves 188 from the rear of the pair of adaptor covers 172. Once fully inserted, the side panels 176 bind adaptor covers 172 together. Cable 106 can be secured to the rear of either adaptor cover 172 by clamp 134 via screws 136, as will be shown in further detail in FIG. 10. Adaptor closing cover 174 includes four hooked retaining legs 192 that mate with corresponding retaining apertures 194 formed in the top surface of each adaptor cover 172. Adaptor closing cover 174 is sized to be wider than the width of adaptor covers 172, and preferably has a width equal to the combined width of the adaptor covers 172 and both the inserted side panels 176. Therefore, when adaptor closing cover 174 is secured to adaptor covers 172, side panels 176 are effectively locked in place.

FIG. 10 shows the rear of wall adaptor 170 prior to attachment of adaptor closing cover 174 to adaptor covers 172. The rails 190 of the side panels 176 are clearly shown engaged with grooves 188. Pairs of screw apertures 144 formed in the rear of adaptor covers 172 receive screws 136 for securing cable 106 to the adaptor covers 172. The alignment of clamp 134 dictates that cable 106 is arranged with its radial axis parallel to the width dimension of the adaptor covers 172. Cable 106 can be routed into wall adaptor 170 from the side opposite to the one where cable 106 is shown seated, and secured to the other pair of screw apertures 144. The arrangement is preferred for installing wall adaptor 170 into cubicle wall units, as will be discussed in further detail with reference to FIG. 11. Those of skill in the art should understand that modifications can be made to the wall adaptor design to accommodate a cable having its radial axis aligned perpendicular to the width direction of adaptor covers 172. In such a modification, the inner walls 196 at the rear of adaptor covers 172 can be thickened for the formation of screw apertures therein.

In an alternative embodiment, wall adaptor 170 can be fitted with a frame, or grommet, for securing it within cubicle walls. Frame 200 is rectangular in shape, having two spacer arms 202 and four wall snaps 204 extending rearwardly. The opening of frame 200 has a greater width and height than the width and height of assembled wall adaptor 170. Each spacer arm 202 has a pair of stop projections 206 extending therefrom, such that the pairs of stop projections 206 on each spacer arm 202 face each other. Each side panel 176 of wall adaptor 170 includes four pairs of depth selector recesses 208, where the pairs of recesses are linearly arranged along the length direction of wall adaptor 170 for receiving a pair of stop projections 206. The function of the frame and the depth selector recesses 208 is described below.

Spacer arms 202, stop projections 206 and depth selector recesses 208 cooperate to permit the face of wall adaptor 170 to extend beyond the face of frame 200 by a preset length determined by the positions of depth selector recesses 208 relative to the face of wall adaptor 170. The wall adaptor 170 extension from frame 200 is maximised when stop projections 206 engage the depth selector recesses 208 furthest away from the face of wall adaptor 170. Conversely, the wall adaptor 170 extension from frame 200 is minimised when stop projections 206 engage the depth selector recesses 208 closest to the face of wall adaptor 170. Once the desired extension is set, the frame 200 with attached wall adaptor 170 is pushed into an appropriately sized wall opening or cubicle wall opening. Wall snaps 204 then engage the edges of the wall opening and lock frame 200 in place.

Figure 11:
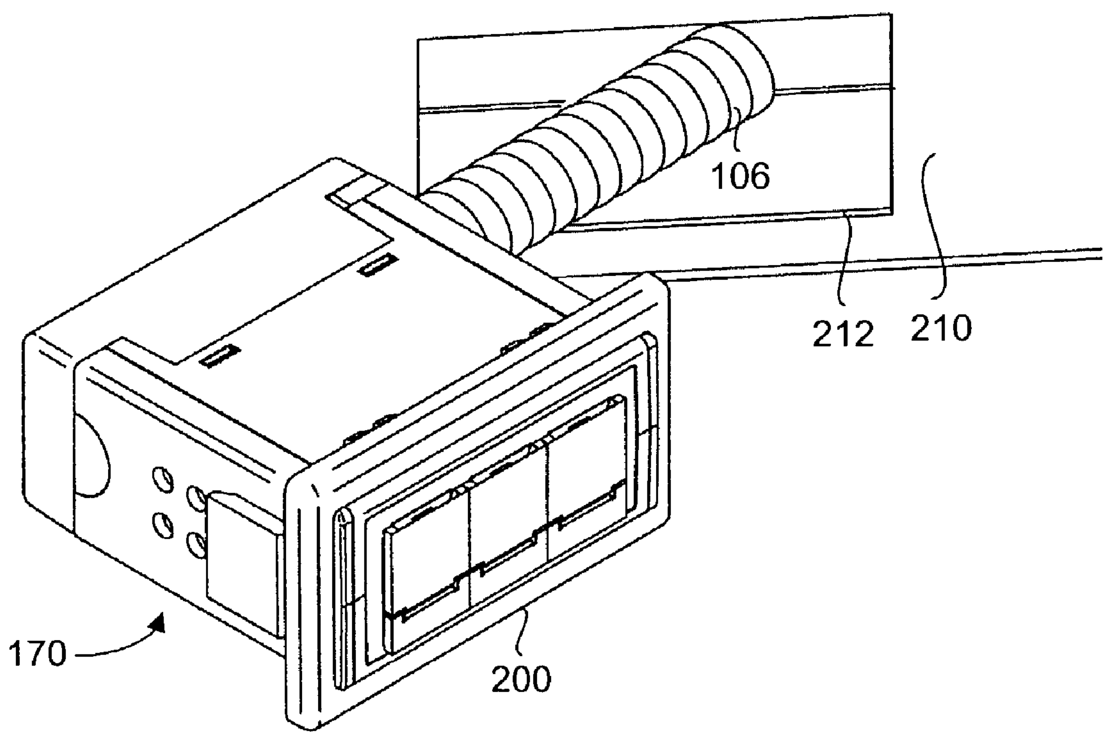
FIG. 11 is an illustration of wall adaptor and frame in accordance with an embodiment of the invention prior to installation within a cubicle wall.

FIG. 11 is an illustration of wall adaptor 170 and frame 200 prior to installation within a cubicle wall. In the situation shown in FIG. 11, pre-assembled wall adaptor 170 has been routed through wall 210 and pulled through wall opening 212. Frame 200 has been attached to wall adaptor 170 for the desired extension length. It should be obvious to those of skill in the art that wall adaptor 170 can be routed from the left side of the wall 210 instead of the right side, and accordingly, cable 106 would be secured at the other side of wall adaptor 170. Installation is completed when frame 200 with attached wall adaptor 170 is pushed into wall opening 212, and wall snaps 204 (not shown) engage the edges of wall opening 212.

The female compound connector 100 shown in FIG. 2 and the male compound connector 120 shown in FIG. 3 can be pre-assembled and connected to a cable by the manufacturer. The cable lengths can be customized to client specifications, or alternatively, sold in preset lengths to be used as zone cables. If a preset length is insufficient for a client's requirements, a combination of specific preset lengths can be serially connected together to obtain the minimum required length by simply plugging the male compound connector of a following cable to the female compound connector of a previous cable. Hence such zone cables can be mass produced to reduce manufacturing costs. Furthermore, the construction of a wall adaptor requires minimal effort since its constituent components are simple to assemble with only a single screwdriver tool. The wall adaptor according to the embodiment of the present invention can be assembled on site, or preferably by the manufacturer if the client desires full customization.

According to another embodiment of the present invention, the zone cables described above can be used to construct zone boxes. As previously shown in FIG. 1, zone box 54 is a distribution point for a predetermined number of data channels received from patch panel via patch wiring 58. The zone box according to the present embodiment is a larger scale version of wall adaptor 170 shown in FIGS. 7 to 11, which uses substantially the same components and is assembled in the same way.

Figure 12:
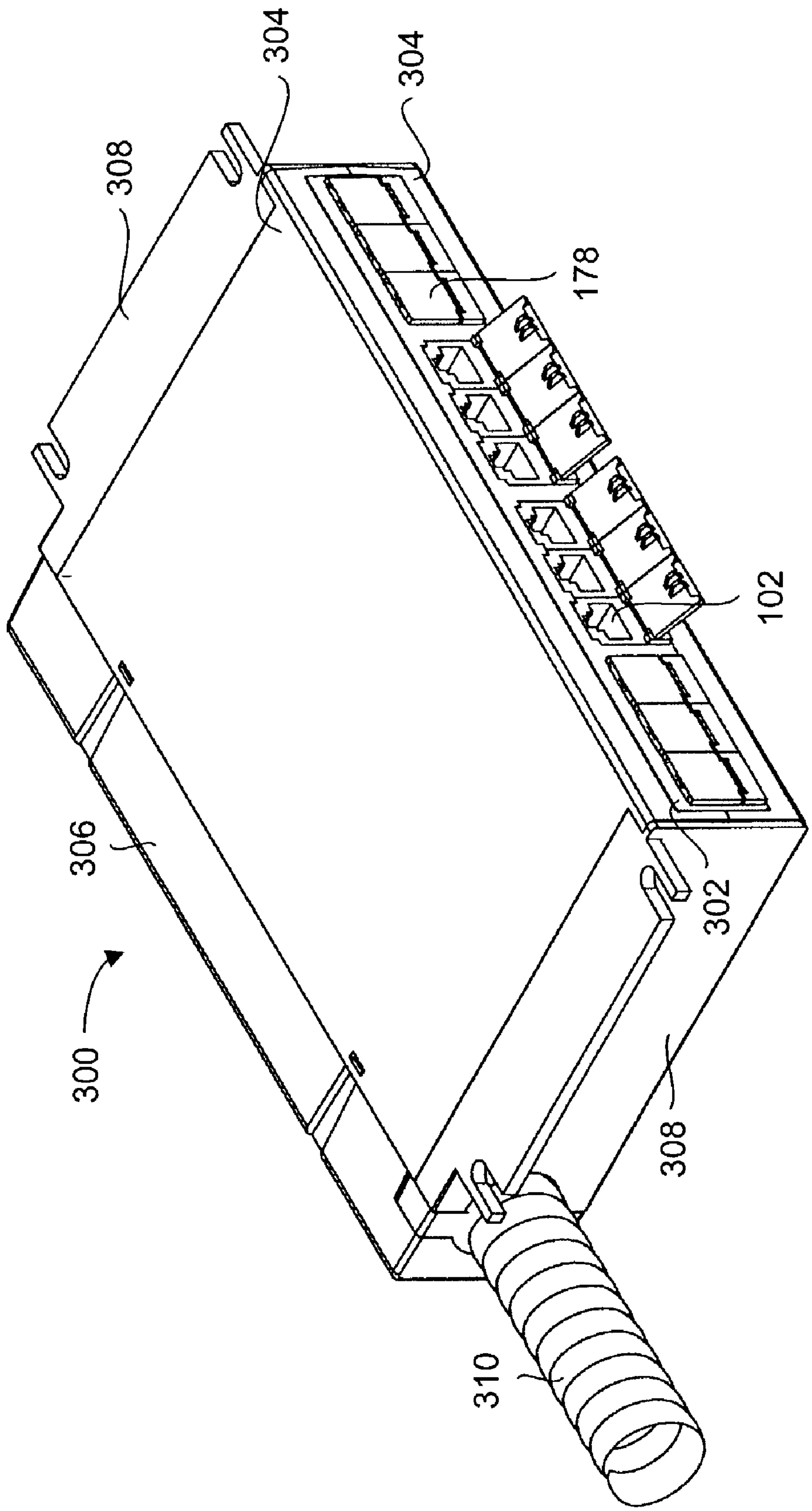
FIG. 12 is an illustration of a zone box according to an embodiment of the present invention.

FIG. 12 is an illustration of a zone box according to an embodiment of the present invention. In this particular example, zone box 300 houses four female compound connectors. Zone box 300 consists of an extended face plate 302, a pair of identical zone box covers 304, a zone box back cover 306, and a pair of side panel attachments 308. Different side panel attachments 308 can be fabricated for different applications, and in the present embodiment, surface mounting panels are used. Zone box 300 protects the wiring and outlets of the female compound connector and provides convenient means for handling all four female compound connectors during installation. Zone box 300 is an elongated version of wall adaptor 170 shown in FIG. 7. In particular extended face plate 302, zone box covers 304 and zone box back cover 306 are constructed to be about four times wider than the width of face plate 108 and adaptor covers 172 of wall adaptor 170 shown in FIG. 7. The assembled zone box 300 of FIG. 12 is shown with an attached patch cable 310 that carries the wires which are connected to the outlets 102 of each female compound connector, and outlet flaps 178 which are the same as those shown in FIG. 7. Further details of zone box 300 are shown in FIGS. 13 to 14.

Figure 13:
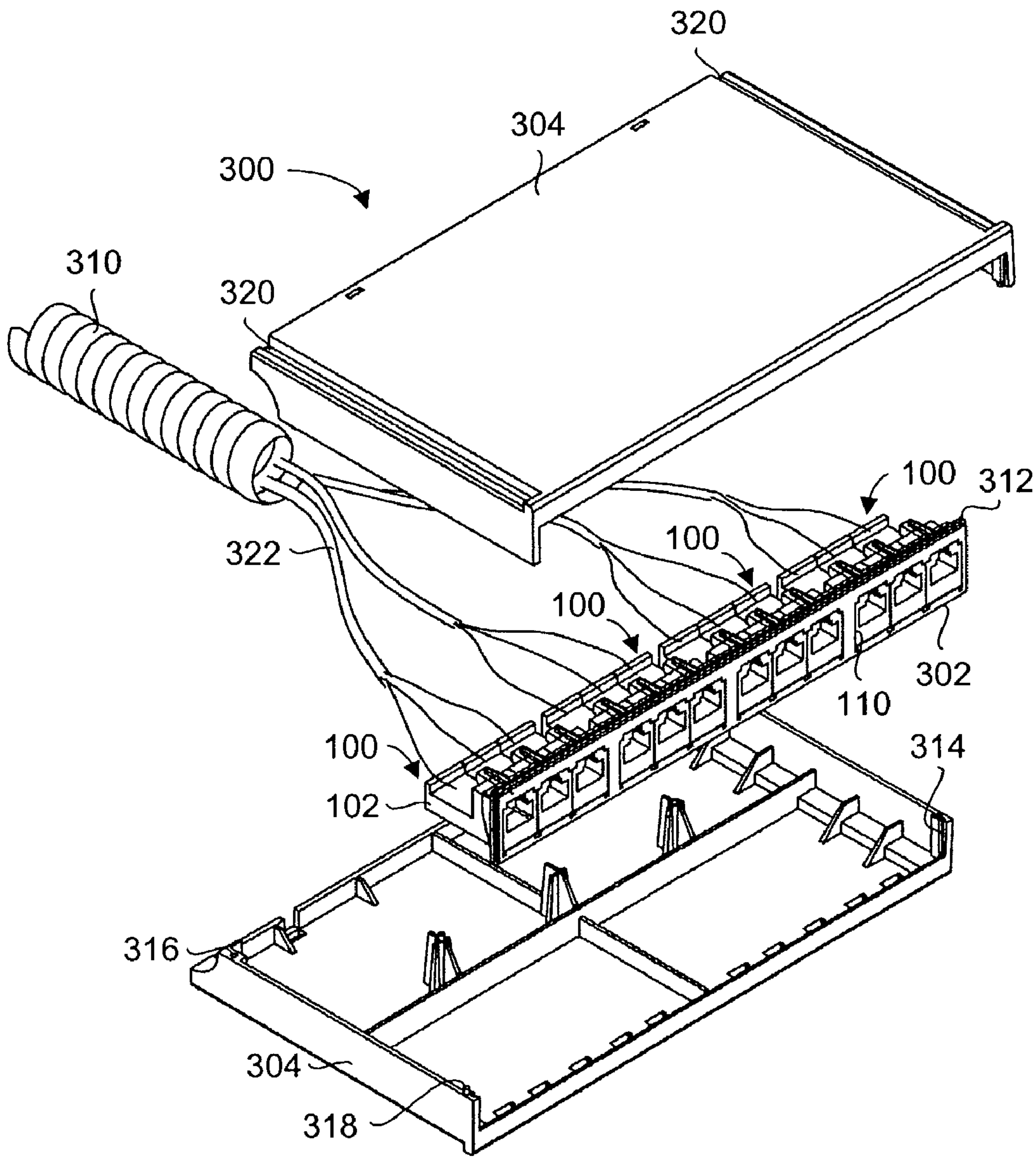
FIG. 13 shows four female compound connectors attached to an extended face plate.
Figure 14:
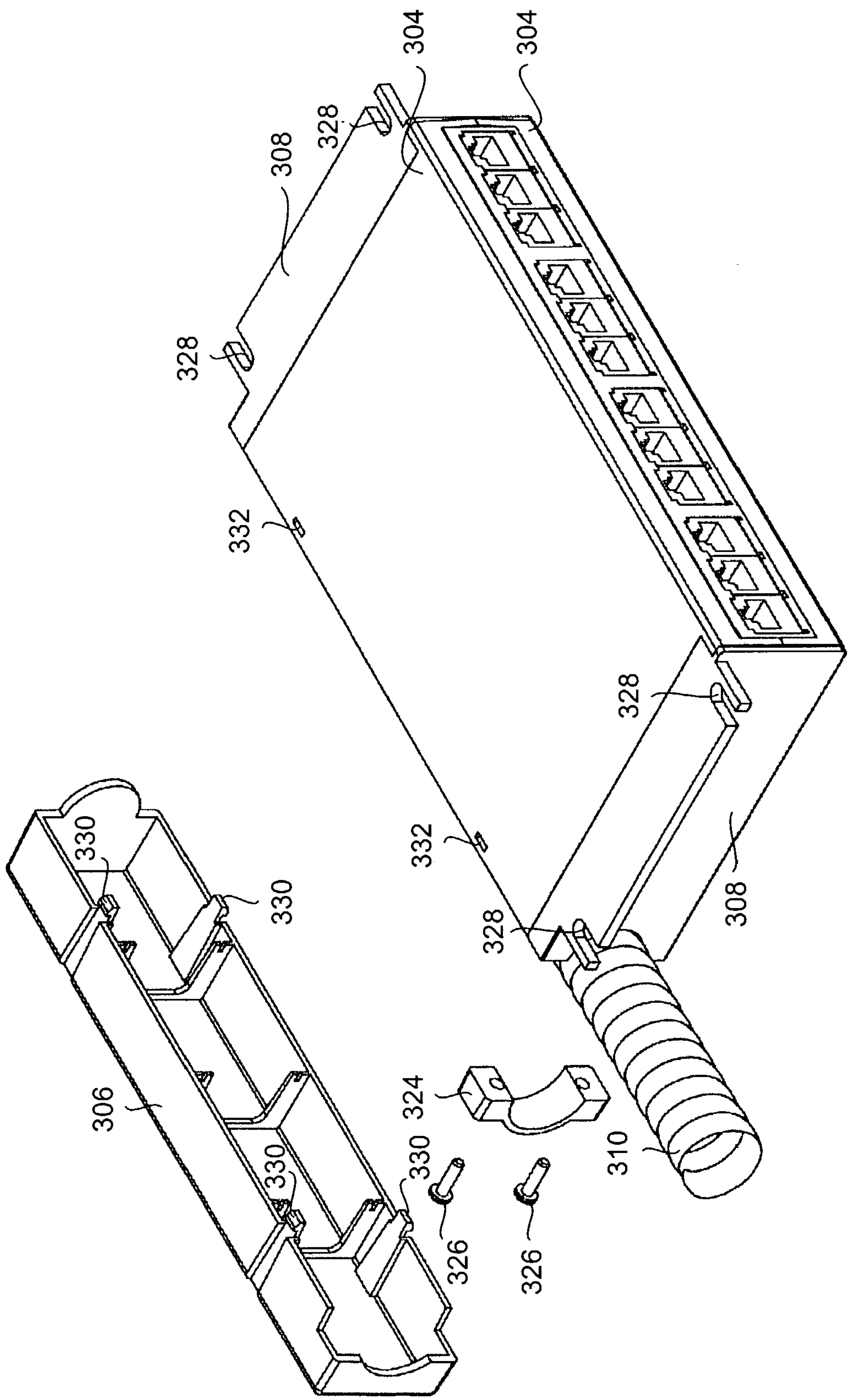
FIG. 14 shows a zone box having fully inserted surface mounting panels, prior to attachment of a zone box back cover.

FIGS. 13 to 14 illustrate the assembly sequence of the zone box shown in FIG. 12, which is the same assembly sequence for wall adaptor 170.

In FIG. 13, four female compound connectors 100 are shown attached to extended face plate 302. Accordingly, extended face plate 302 includes four openings 110, each having an identical shape to opening 110 in face plate 108 of FIG. 2. A continuous ridge 312 on extended face plate 302 mates with corresponding continuous grooves 314 in the zone box covers 304 by sliding the vertical portions of the continuous ridge 312 into the vertical portions of the continuous grooves 314. Each zone box cover 304 further includes a round recess 316 and a round projection 318 that mate with a corresponding projection and recess respectively of the other zone box cover 304. As with wall adaptor 170, the continuous ridge 312, the continuous groove 314, the round projections and round recesses 316 cooperate to prevent lateral movement of the zone box covers 304 relative to each other when assembled together. Grooves 320 formed at the corners of each zone box cover 304 are similar to grooves 188 shown in FIG. 9, and receive corresponding rails of each surface mounting panel 308. Although not shown in the figures, the corresponding rails of the surface mounting panels 308 have the same cross-sectional shape as rails 190 of side panels 176 in FIG. 9 for binding zone box covers 304 to each other when fully inserted onto grooves 320. The wires corresponding to the same data channel are physically grouped together in their own channel cable 322, and all the channel cables 322 associated with zone box 300 are physically grouped together in a patch cable 310. In this particular example, the components of zone box 300 are constructed to house four pre-assembled female compound connectors 100 in a row configuration. However, it should be obvious to those of skill in the art that zone box 300 can be constructed to house more than four female compound connectors, and in configurations other than in the row configuration shown in FIG. 12. For example, zone box 300 can be constructed to house female compound connectors arranged in multiple rows, or in a stacked column configuration.

FIG. 14 shows zone box 300 having fully inserted surface mounting panels 308, prior to attachment of zone box back cover 306. Extending perpendicularly away from each surface mounting panel 308 are mounting wings each having a pair of screw apertures 328. Hence each zone box 300 can be secured to any flat surface with screws. Zone cable 310 can be secured to the rear of zone box cover 304 by zone cable clamp 324 via screws 326 in the same manner as cable

106 is secured to adaptor covers 172 in FIG. 9. Zone box back cover 306 includes four hooked retaining legs 330 that mate with corresponding retaining apertures 332 formed in top surface of each zone box cover 304. Zone box back cover 306 is sized to be wider than the width of zone box covers 304, and preferably has a width equal to the combined width of the zone box covers 304 and both the inserted surface mounting panels 308. Therefore, when zone box back cover 306 is secured to zone box covers 304, surface mounting panels 308 are effectively locked in place. Although not shown in the figures, screw apertures are formed in the rear of zone box covers 304 to receive screws 326.

As previously shown in FIG. 13, channel cables 322 are grouped together within patch cable 310 in the same way that wires 104 are grouped together within zone cable 106. However, those of skill in the art will appreciate that the four channel cables 322, each housing a plurality of wires, will require patch cable 310 to have a larger diameter than zone cable 106. Naturally, the height of each zone box 300 will be at least the diameter of patch cable 310.

Since the zone box of the present embodiment is an enlarged version of the wall adaptor shown in FIGS. 7 to 10, the same steps used for assembling the wall adaptor shown in FIGS. 8 to 10 are used for assembling the zone box. The zone box according to the embodiment of the present invention can be assembled on site, or preferably by the manufacturer if the client desires full customization.

Figure 15:
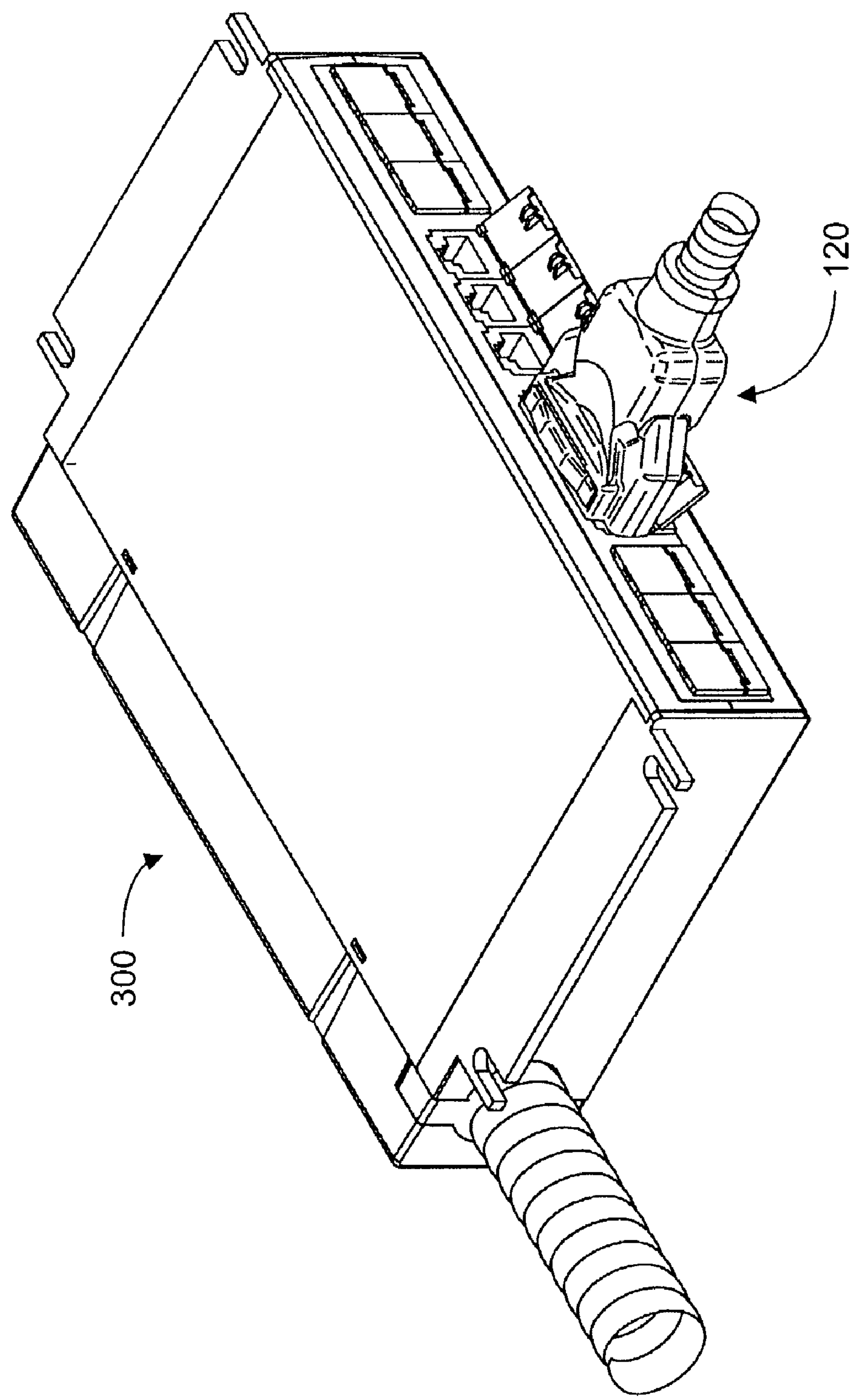
FIG. 15 shows a male compound connector of a zone cable plugged into the female compound connector of a zone box.

FIG. 15 shows a male compound connector 120 of a zone cable plugged into the female compound connector 100 of a zone box 300. Because each zone cable and associated data channel is designated for a specific workstation or cubicle, identifying markings can be used to match the correct data channel with the designated cubicle. For example the faces of each female compound connector 100 and the male compound connectors 120 can be colour coded to simplify installation. Apart from matching the data channel of the zone box to a specific zone cable, installing the modular wiring system can be done without error because the outlets of the female compound connectors and the plugs of the male compound connectors are physically arranged in a preset configuration. In other words, the installer does not need to concern him/herself with plugging in an individual voice plug into a corresponding voice outlet. Moreover, each female and male compound connector combination linked by an intermediate zone cable is prewired to service one workstation. Consequently, the installer need not concern him/herself with identifying, as is currently necessary, the three individual zone cables for voice, data and printer which are associated with a particular workstation. Of course, since the zone wires with attached male and female compound connectors can be tested in the factory for connection reliability, on-site cable end dressing and the associated mistakes and contact failures, are completely avoided with the wiring system of the invention. Hence installation of the modular wiring system does not require specialized technicians and labour cost savings can be realized.

Zone boxes 300 shown in the previous figures can be used for constructing a patch panel according to an embodiment of the present invention. Because the fundamental component of the patch panel are zone boxes 300, only different types of side panel attachments are required for its assembly.

Figure 16:
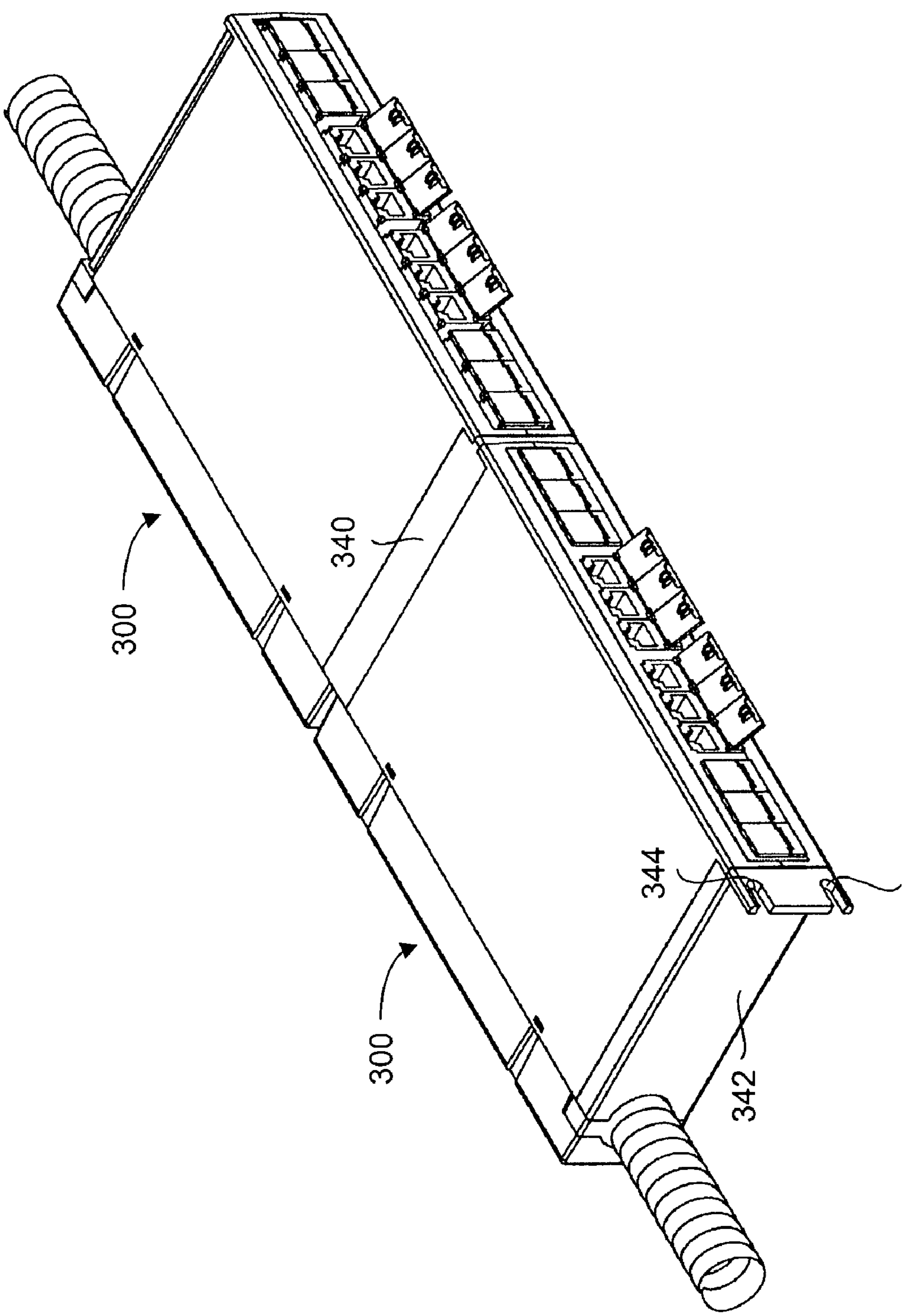
FIG. 16 shows a pair of ganged zone boxes of a patch panel according to an embodiment of the present invention.

FIG. 16 shows a pair of zone boxes 300 of a patch panel according to an embodiment of the present invention. Both zone boxes 300 are ganged together in a row configuration, where multiple pairs of zone boxes can be stacked on top of one another in a column. Although not shown in FIG. 16, each pair of zone boxes 300 is secured to a panel frame. Ganging each pair of zone boxes and securing them to the panel frame requires different side panel attachments than the surface mounting panels shown in FIGS. 14 and 15 for mounting the zone box to a flat surface. A coupling panel 340 includes a first pair of rails (not shown) for sliding into the pair of grooves of a first zone box 300, and a second pair of rails (not shown) for sliding into the pair of grooves of a second zone box 300. Once inserted, coupling panel 340 couples both zone boxes 300 to each other. The cross-sectional shape of the first and the second pair of rails is the same as the rails of side mounting frame 308 and side panel 176, and hence does not require further description. Frame mounting panel 342 is inserted onto the grooves opposite to the grooves engaged with coupling panel 340, and includes a mounting wing that extends perpendicularly away from zone box 300. A frame mounting panel 342 is intentionally omitted from the right side zone box 300 in FIG. 16. The mounting wing includes screw apertures 344 for receiving screws that secure zone box 300 to the panel frame. The difference between surface mounting panel 308 and frame mounting panel 342 is the orientation of their mounting wings. The mounting wing of surface mounting panel 308 is coplanar to the top surface of zone box 300, while the mounting wing of the frame mounting panel 342 is coplanar to the extended face plate of zone box 300.

Figure 1:
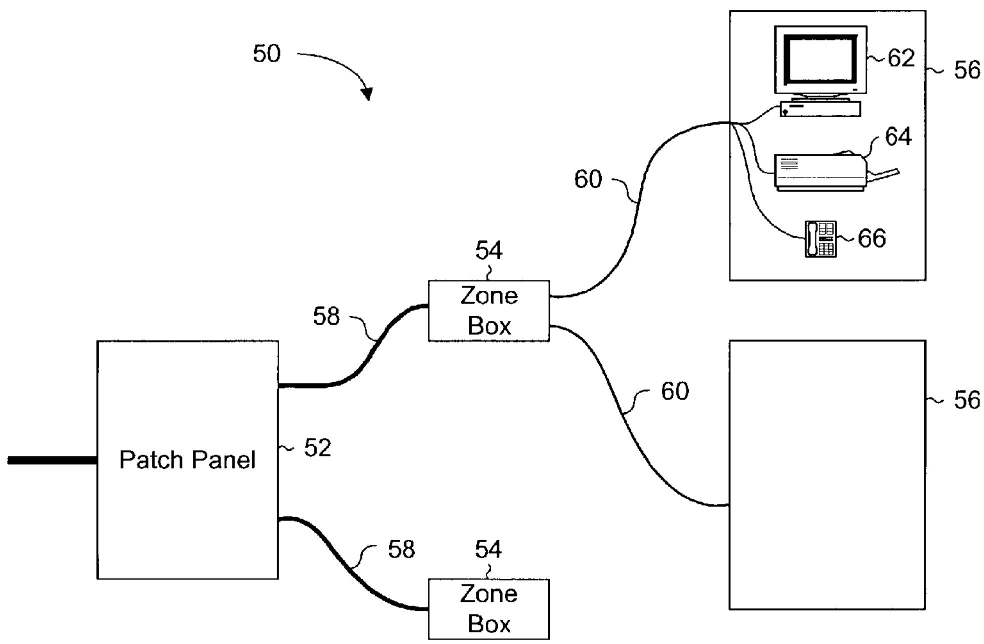
FIG. 1 is a schematic view of a prior art zone wiring setup.

The reduced number of components used in the modular wiring system according to the embodiments of the present invention lowers the overall cost of the system. More specifically, reusing existing components to construct larger components reduces the overall componentry cost of the system. Referring to FIG. 1, if the zone wiring system 50 is implemented with the components of the modular wiring system according to embodiments of the invention, then at least two main types of components are required. The first components are zone cables 106 having female compound connectors and male compound connectors, and the second components are zone boxes 300. As shown in FIGS. 12–15, each zone box 300 is a physical grouping of the female compound connectors of several zone cables 106, and each patch panel is a collection of zone boxes 300. Accessories such as side panel attachments, wall adaptors and grommets are easily manufactured for adapting the main components for use in specific applications.

Figure 17:
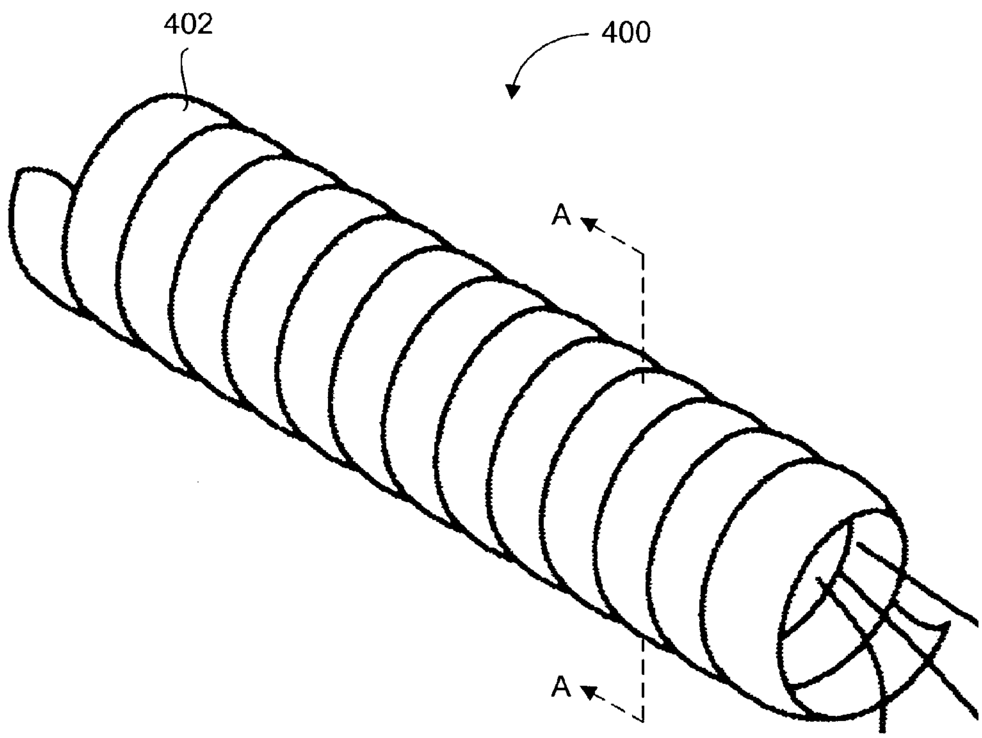
FIG. 17 shows a patch cable according to an embodiment of the present invention; and, FIG. 18 shows a cross-section of the patch cable shown in FIG. 17 along line A—A.
Figure 18:
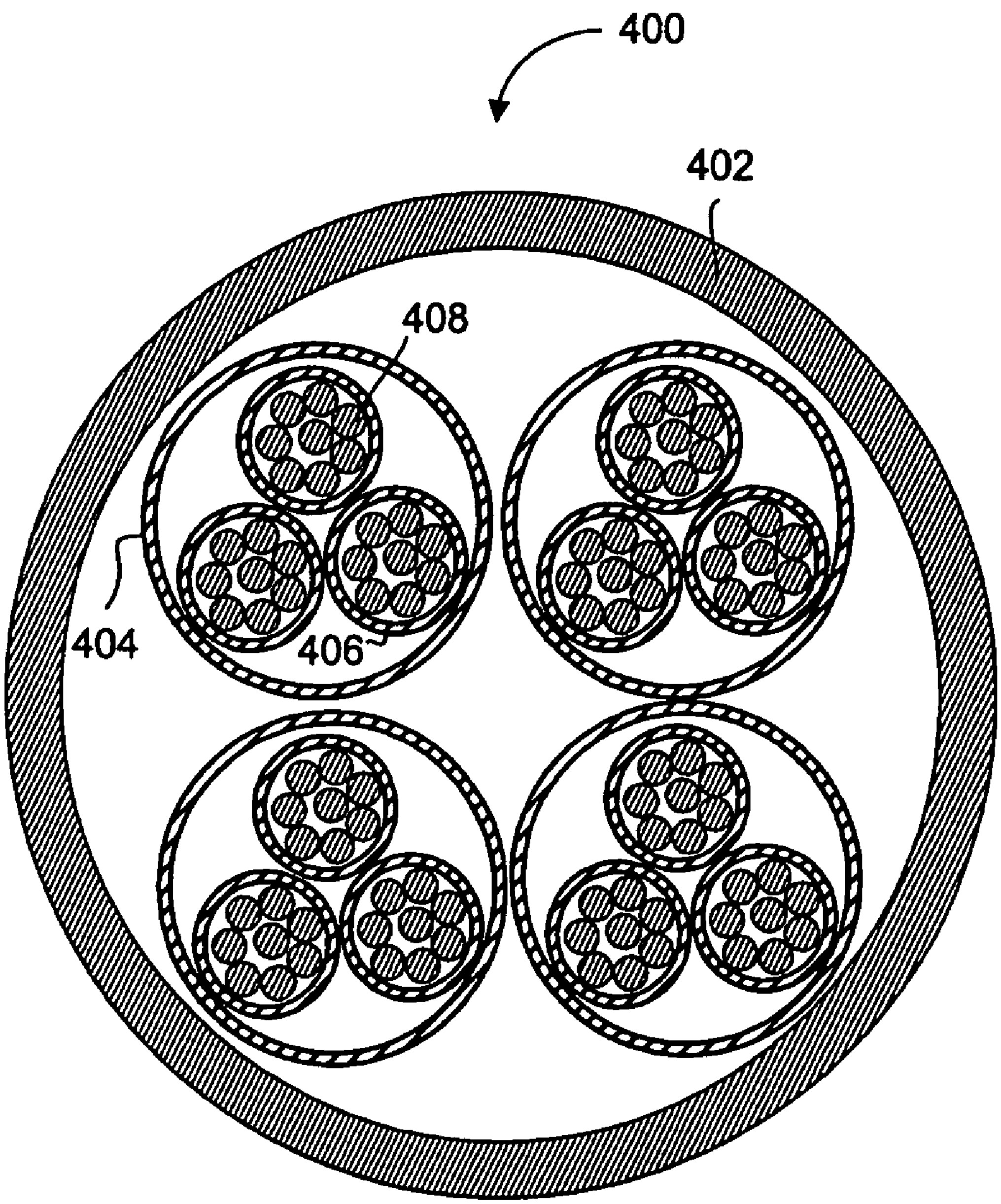

According to another embodiment of the present invention, the patch cables 58 and zone cables 60 can be manufactured or pre-assembled with sets of wires or cables bundled together to facilitate on-site installation of the modular wiring system previously shown and discussed. In a preferred embodiment, the cables are bundled in a hierarchical configuration such that each patch cable 58 bundles a predetermined number of zone cables 60, each zone cable 60 bundles a predetermined number of communication cables, and each communication cable bundles a predetermined number of communication lines. The communication lines can include any signal transmission medium such as copper wires and optical fibre lines for example. FIGS. 17 and 18 illustrate a patch cable according to an embodiment of the present invention that is configured for use with the zone wiring system components disclosed in the previous figures.

A patch cable 400 according to an embodiment of the present invention for connecting a patch panel to one zone box in a zone wiring system is shown in FIG. 17. In the present example, it is assumed that the zone cable carries all the wires for a corresponding zone box. Zone cable 400 includes a wound armoured sheath 402 for bundling four zone cables. The armored sheath 402 of zone cable 400 is well known in the art and provides electrical and mechanical shielding for the bundled cables. Furthermore, sheath 402 limits the bending arc of zone cable 400 and its bundled cables within industry specifications.

FIG. 18 shows a cross-sectional view of patch cable 400 of FIG. 17 taken along line A—A. In the present example, four zone cables 404 are bundled within patch cable 400 since the zone box, such as zone box 300 shown in FIG. 12, is configured to receive up to four zone cables 404. Each zone cable 404 bundles three communication cables 406, and each communication cable 406 bundles a set of communication lines 408. Each communication cable 406 is associated with a data channel. In use, one end of each zone cable 404 is connected to a male compound connector such as male compound connector 120 shown in FIG. 4, for insertion into patch panel 52, and the other end of each zone cable 404 is connected to a female compound connector, such as female compound connector 100 shown in FIG. 2, for assembly into zone box 300.

Preferably, each zone cable 404, communication cable 406 and communication line 408 is labelled or colour coded to facilitate proper electrical connection to the outlets/plugs that are associated with the corresponding zone cable 404. Because of the hierarchical bundling of the wires and cables, identification of the individual communication lines can be achieved quickly.

Connectivity between each workstation area to the zone box 300 can achieved by using a zone cable 404 having an armoured sheath similar to armour sheath 402. Such a zone cable can be identical in configuration to zone cable 404 shown in FIG. 18 and can have its ends connected to male and female compound connectors.

An advantage to bundling other than simplified installation is reduced bulk of the cable since many insulating layers become superfluous in the bundled environment. For example, each zone cable 404 of patch cable 400 can consist of a mylar coating to bundle its communication cables, and each communication cable 406 can consist of a mylar coating to bundle its communication lines 408. The minimum electrical insulation requirements can be met while reducing the bulk and weight of the patch cable.

Other important advantages of the modular wiring system of the present invention are improved reliability, reduced on-site installation time and improved ease of installation. Contrary to existing wiring methods, no on-site wire dressing and wire end connections need be made. Due to the modular character of the present wiring system, all wiring components can be pre-assembled in the factory, which means transmission quality of the cables and connectors can be tested prior to on-site installation. Moreover, the modular character of the present system significantly reduces on-site installation time, since the installation process is limited to placement of the finished cable, including the end connectors, zone boxes, or wall adaptors and the interconnecting cable bundle, at the desired location and plugging in of the end connectors. This reduces installation time, because it is no longer necessary to fish individual wires through the ceiling, floor or wall installation space. Additionally, when armoured sheath cable is used, installation time is further reduced, since the installation of conduits for the individual wires, as required under most building codes, is obviated. The armoured sheath furthermore significantly reduces the danger of damage to the individual wires by sharp objects or by bending the cable at improper radii. Finally, on-site cabling errors are significantly minimized by the use of the modular wiring system of the invention after pre-assembly, testing and labelling of the connector ends in the factory, less installation space is needed due to the bundling of the wires in a compound cable, and tracing of individual cables in the installation space is much facilitated.

An example of an installation procedure follows. Once the layout of an office is determined, the floor plans are reviewed by the modular wiring system manufacturer, such as Electec Limited (Ottawa, Canada). The manufacturer then customizes the appropriate cable lengths, assembles all the necessary wiring components, such as a patch panel, zone boxes 300, wall adaptors 170 and all bundled cabling and then tests the assembled wiring components at the factory. The patch panel, zone boxes 300 and wall adaptors 170 are then installed on site at their designated locations and their respective cables are routed to their designated sources. The final step is plugging male compound connectors into the patch panel and the zone boxes.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A building zone wiring system for providing a data connection between a patch panel having a data channel and a workstation, comprising:

a first cable for connecting the data channel with a node, the cable having a first male compound connector for plugging into the patch panel and a first female compound connector for location at the node, the first male compound connector having at least two commercially available plugs, each commercially available plug receiving one communication signal of the data channel, and the first female compound connector having at least two commercially available jacks, each commercially available jack being coupled to a corresponding commercially available plug; and a second cable for continuing the data channel from the node to the workstation, the second cable having a second male compound connector configured identically to the first male compound connector and for plugging into the first female compound connector, and a second female compound connector identically configured to the first female compound connector for location at the workstation.

2. The building wiring system of claim 1, wherein the second female compound connector is housed in a cable grommet for securing the second female compound connector in a structure.

3. The building wiring system of claim 1, wherein the data channel includes three communication signals.

4. The building wiring system of claim 1, wherein the first male compound connector and the second male compound connector include three commercially available plugs, each commercially available plug receiving a respective communication signal.

5. The building wiring system of claim 4, wherein the first female compound connector and the second female compound connector include three commercially available outlets, each commercially available outlet being coupled to a corresponding commercially available plug.

6. The building wiring system of claim 5, wherein the three commercially available plugs and the three commercially available outlets are arranged in a row configuration.

7. The building wiring system of claim 5, wherein the three commercially available plugs of the first male compound connector and the second male compound connector, and the three commercially available outlets of the first female compound connector and the second female compound connector are arranged in a predefined configuration.

8. The building wiring system of claim 7, wherein each commercially available plug is removably connectable to each commercially available outlet.

9. The building wiring system of claim 8, wherein each commercially available plug includes a locking tab for interlocking with each commercially available outlet.

10. The building wiring system of claim 9, wherein the first male compound connector includes a release button positioned for simultaneously depressing each locking tab.

11. The building wiring system of claim 1, wherein the zone box is shaped to house a predetermined number of second female compound connectors.

12. The building wiring system of claim 11, wherein the patch panel includes a plurality of zone boxes.

13. The building wiring system of claim 1, wherein the at least two commercially available plugs of the first and the second male compound connectors have identical configurations, and the at least two commercially available outlets of the first and the second female compound connectors have identical configurations.

14. The building wiring system of claim 1, wherein one of the at least two commercially available plugs of the first and the second male compound connectors has a different configuration than the other of the at least two commercially available plugs, and one of the at least two commercially available outlets has a different configuration than the other of the at least two commercially available outlets.

15. A building wiring system comprising:

a patch panel having a predetermined number identical female compound receptacles for providing respective data channels therefrom;

a cable bundle having identically configured male compound connectors, each pluggable into one of the female compound receptacles, for coupling the data channels to corresponding identically configured female compound connectors;

a zone box for housing the female compound connectors; and, a cable having a modular male compound connector identically configured to each male compound connector and pluggable into one of the female compound connectors, for coupling one of the data channels to a corresponding modular female compound connector identically configured to each female compound connector.

16. The building wiring system of claim 15, wherein the modular female compound connector is housed in a cable grommet for securing the modular female compound connector in a structure.

17. The building wiring system of claim 15, wherein each male compound connector includes at least two commercially available plugs, each commercially available plug receiving one communication signal of one of the data channels, and each female compound connector includes at least two commercially available jacks, each commercially available jack being coupled to the corresponding commercially available plug.

18. The building wiring system of claim 17, wherein each male compound connector includes a casing for partially housing the at least two commercially available plugs.

19. The building wiring system of claim 18, wherein the casing of the first male compound connector includes a release button positioned for simultaneously depressing each locking tab.

20. The building wiring system of claim 17, wherein the at least two commercially available plugs of the first and the second male compound connectors have identical configurations, and the at least two commercially available outlets of the first and the second female compound connectors have identical configurations.

21. The building wiring system of claim 17, wherein one of the at least two commercially available plugs of the first and the second male compound connectors has a different configuration than the other of the at least two commercially available plugs, and one of the at least two commercially available outlets has a different configuration than the other of the at least two commercially available outlets.

22. The building wiring system of claim 17, wherein the male compound connector includes three commercially available plugs, each commercially available plug receiving a respective communication signal.

23. The building wiring system of claim 22, wherein the first female compound connector includes three commercially available outlets, each commercially available outlet being coupled to a corresponding commercially available plug.

24. The building wiring system of claim 23, wherein the three commercially available plugs of the first male compound connector, and the three commercially available outlets of the first female compound connector are arranged in a predefined configuration.

25. The building wiring system of claim 24, wherein the three commercially available plugs and the three commercially available outlets are arranged in a row configuration.

26. The building wiring system of claim 23, wherein each of the three commercially available plugs is removably connectable to each of the three commercially available outlets.

27. The building wiring system of claim 23, wherein each of the three commercially available plugs includes a locking tab for interlocking with each of the three commercially available outlets.

28. The building wiring system of claim 15, wherein the cable bundle includes a sheath for bundling a predetermined number of zone cables within the sheath, each zone cable housing a plurality of communication lines, and, a predetermined number of communication cables bundled within each zone cable, each communication cable housing the communication lines associated with one of the data channels.

29. The building wiring system of claim 28, wherein the cable bundle includes four zone cables.

30. The building wiring system of claim 28, wherein each zone cable bundles three communication cables.

* * * * *